Figure 7:
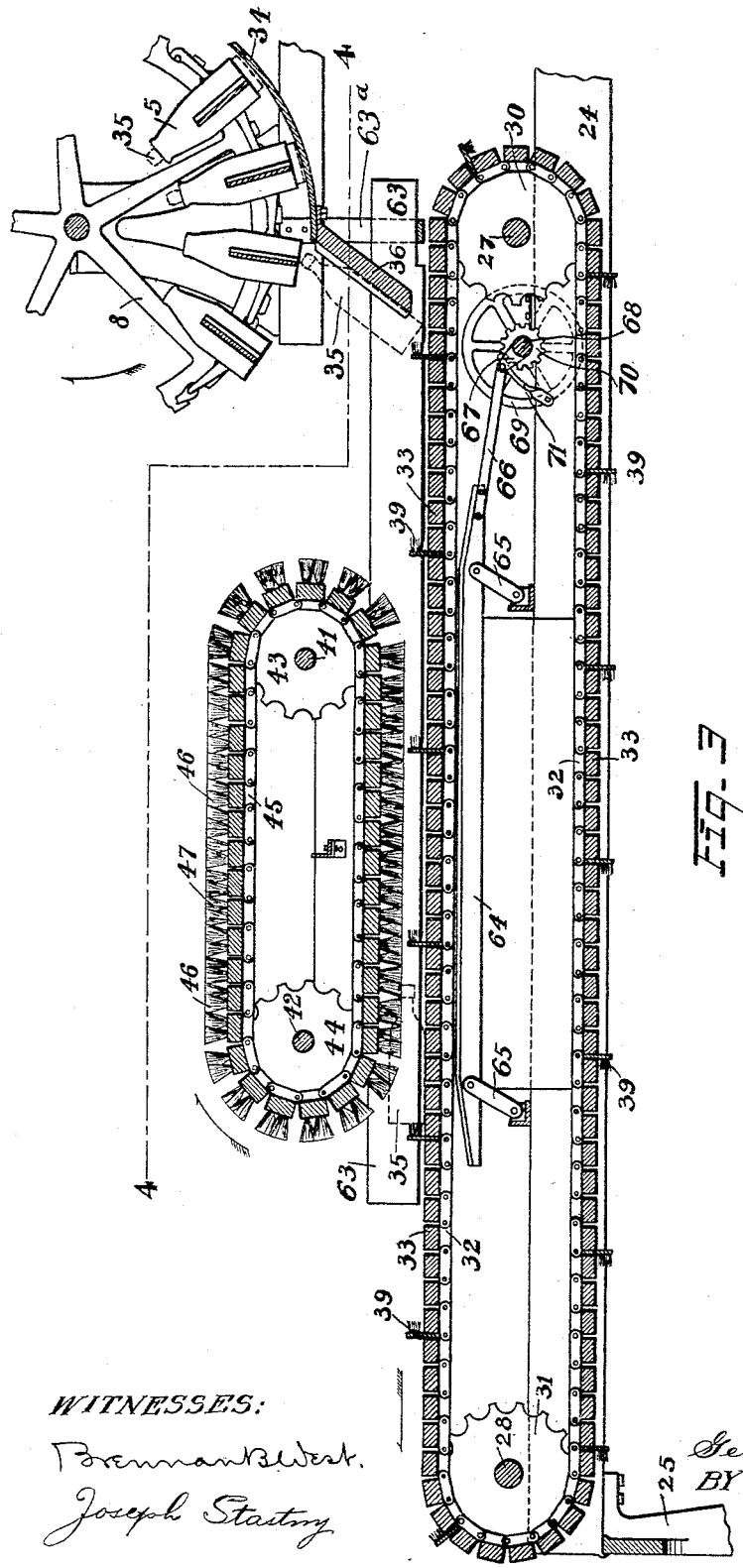

G. R. LAWRENCE.
MACHINE FOR CLEANING BOTTLES OR LIKE ARTICLES.
APPLICATION FILED DEC. 31, 1906.
932,145.
Patented Aug. 24, 1909.
4 SHEETS—SHEET 1.
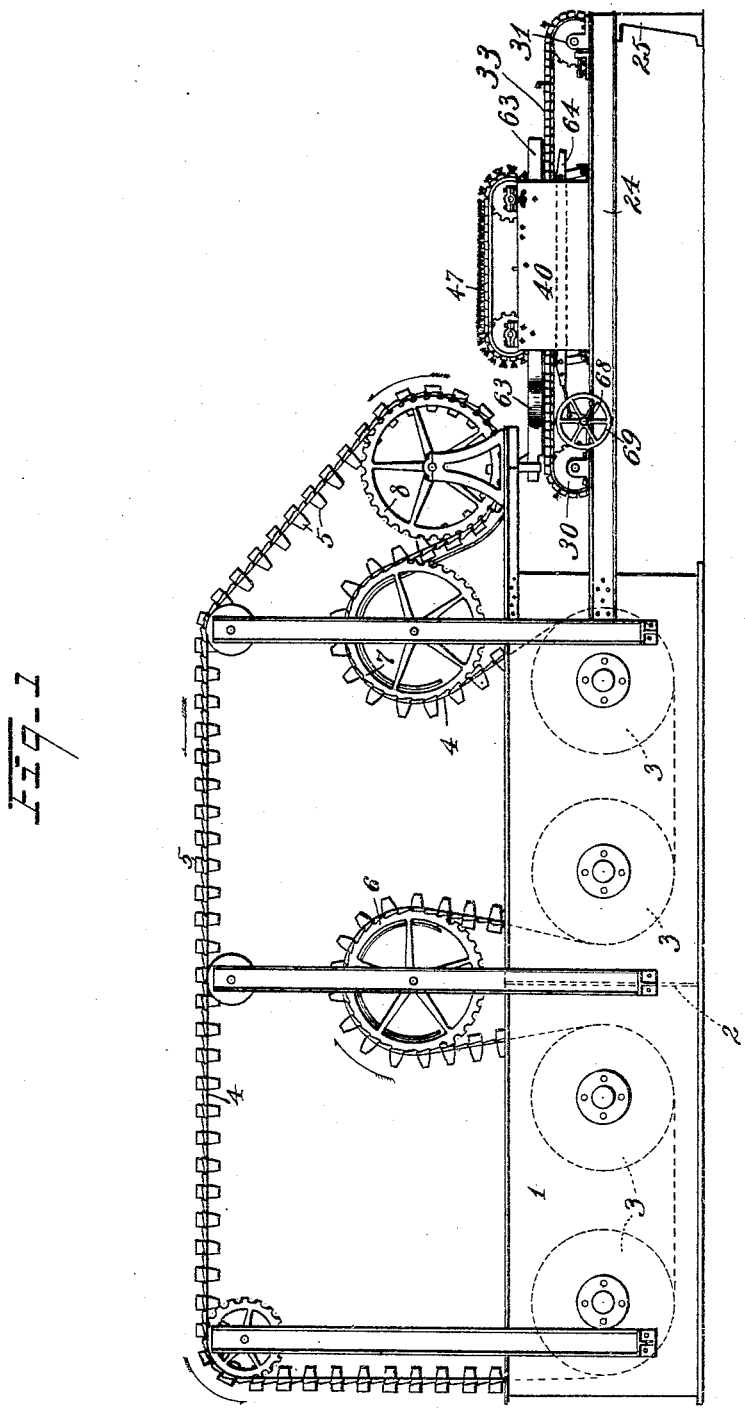
WITNESSES:
Brennan B. West
Joseph Stastny
INVENTOR,
George R. Lawrence.
BY Bates, Fouts & Hull
ATTYS.

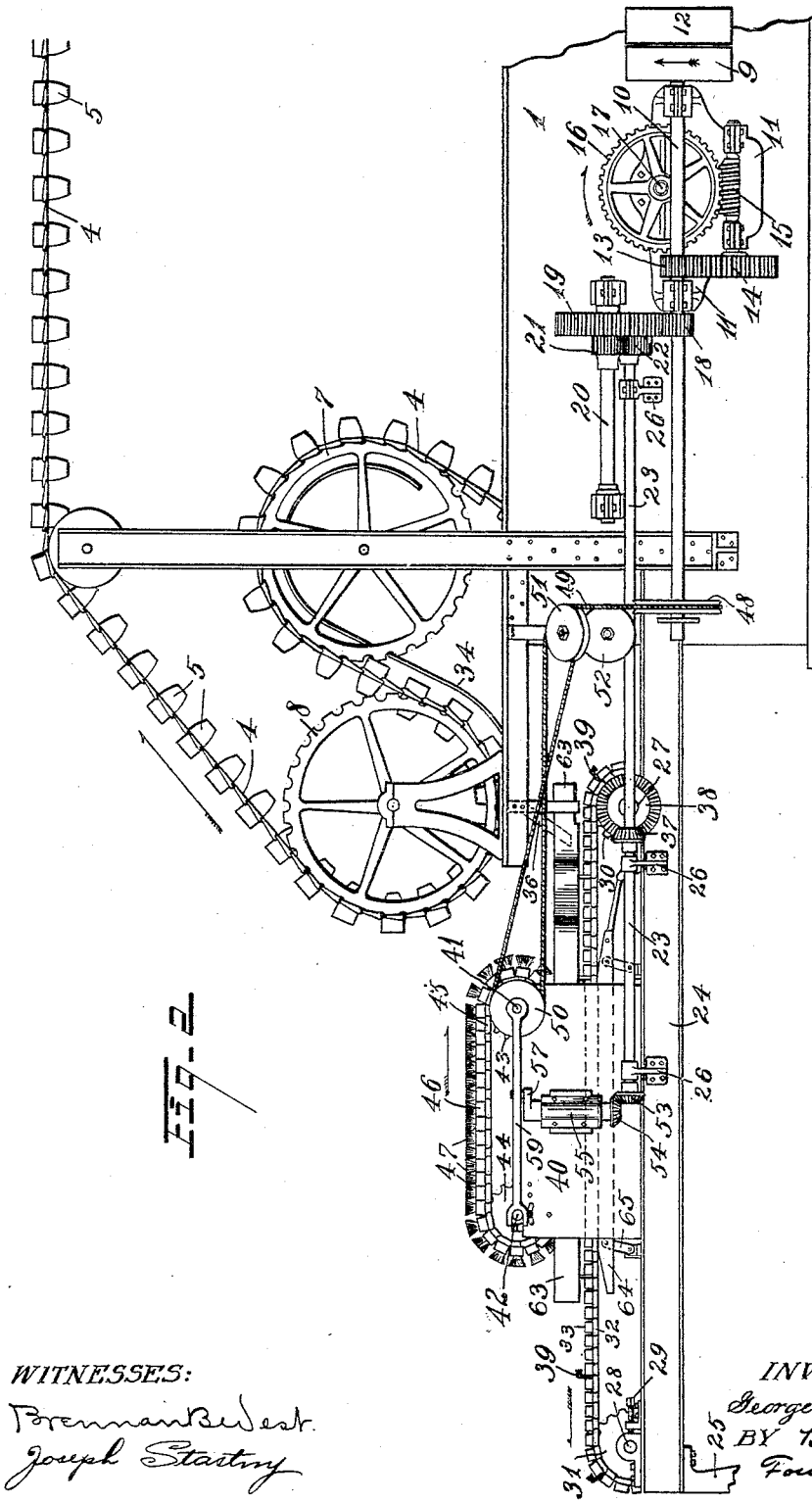

G. R. LAWRENCE.
MACHINE FOR CLEANING BOTTLES OR LIKE ARTICLES.
APPLICATION FILED DEC. 31, 1906.

932,145.

Patented Aug. 24, 1909.
4 SHEETS—SHEET 3.

WITNESSES:
Brennan B. West.
Joseph Stastny

INVENTOR,
George R. Lawrence.
BY Bates, Fouts & Hull
ATTYS.

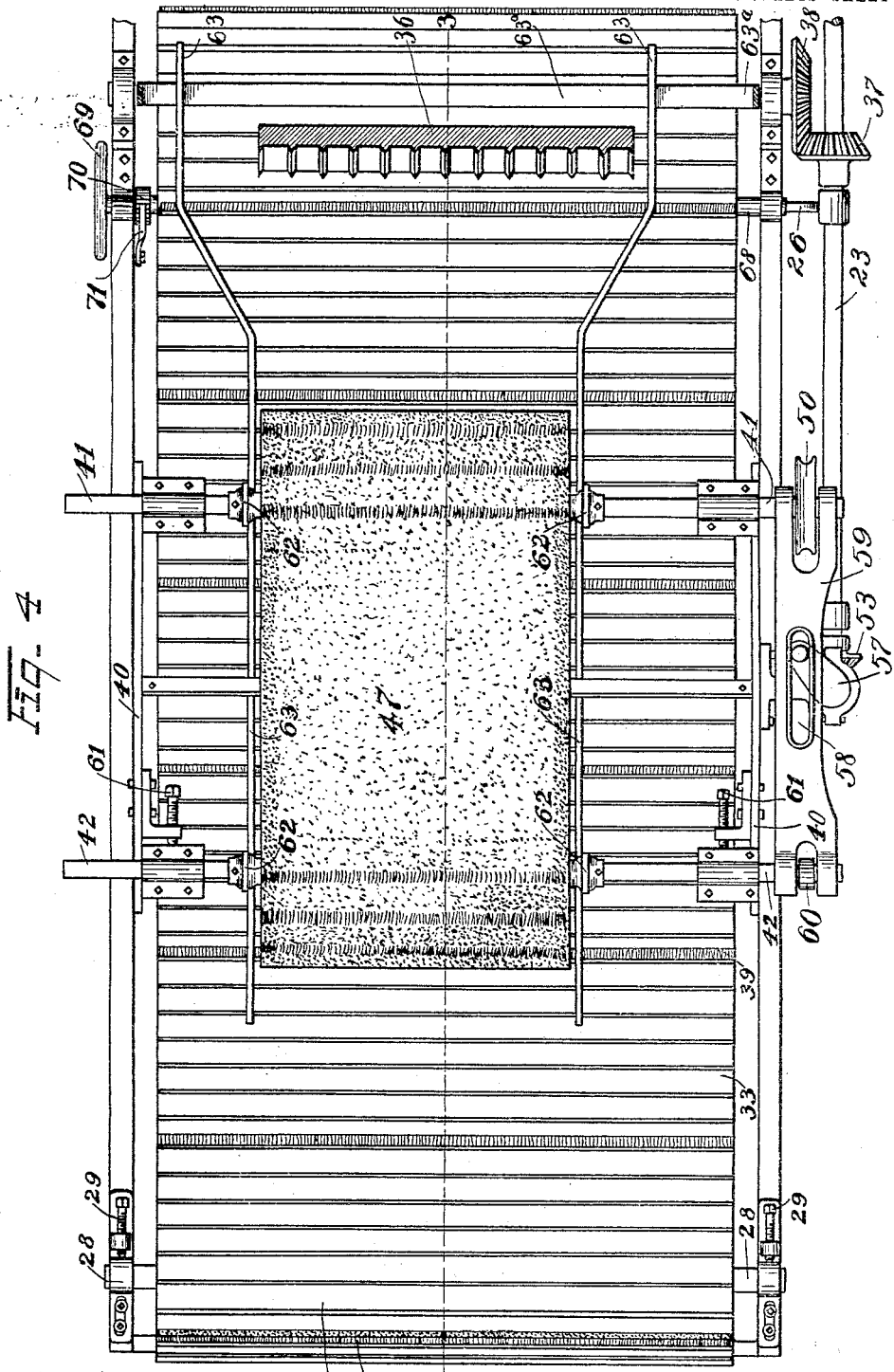

UNITED STATES PATENT OFFICE.

GEORGE R. LAWRENCE, OF CLEVELAND, OHIO, ASSIGNOR TO THE LOEW MANUFACTURING COMPANY, OF CLEVELAND, OHIO, A CORPORATION OF OHIO.

MACHINE FOR CLEANING BOTTLES OR LIKE ARTICLES.

932,145.     Specification of Letters Patent.     Patented Aug. 24, 1909.

Application filed December 31, 1906. Serial No. 350,279.    REISSUED

*To all whom it may concern:*

Be it known that I, GEORGE R. LAWRENCE, a citizen of the United States, residing at Cleveland, in the county of Cuyahoga and State of Ohio, have invented a certain new and useful Improvement in Machines for Cleaning Bottles or Like Articles, of which the following is a full, clear, and exact description, reference being had to the accompanying drawings.

This invention relates to machines for cleaning bottles or like articles, and it has particular reference to a device for scrubbing or cleaning the exterior of the bottles.

The object of the invention is to produce a device of the character stated which will be economical in manufacture and rapid and efficient in operation.

In the accompanying drawings, the said exterior cleaning device is shown as applied to that general type of device for cleaning the interior of bottles, that is shown in the patent to Loew, No. 700,518. While the device is particularly applicable to bottle cleaners of the type shown in said patent, it is not necessarily limited to use therewith, but may be employed in connection with interior cleaners for bottles of different types from that shown.

In the drawings forming a part of this application, Figure 1 is a side elevation of a machine for cleaning the interior of bottles, the said machine having my improved exterior cleaning device applied thereto. Fig. 2 is a side elevation of my invention looking at the same from the side opposite that of Fig. 1, said view also showing a portion of the interior cleaning mechanism and the manner in which my invention is attached thereto. Fig. 3 is a longitudinal sectional view through my cleaning device, taken substantially on the line 3—3 of Fig. 4, and Fig. 4 is a plan view of my cleaning device, said view being taken substantially on the line 4—4 of Fig. 3.

As has been stated, and as is shown in the patent above referred to, devices for cleaning the interior of bottles with rapidity and in large quantities are well known and are commercially successful. In such devices, however, the exterior of the bottles have not been thoroughly cleansed, which cleansing requires a subsequent operation. With my exterior cleaning device applied to one of said machines, the bottles will be cleaned both on their interior and exterior surfaces and will thereby be placed in condition for refilling.

Taking up a more detailed description of the invention by reference to the accompanying drawings, 1 represents the vat or tank of what I shall herein term the interior cleaner, said tank being divided by a partition 2, into a plurality of separate compartments for the cleansing liquids. Within each of said compartments, I mount sprocket wheels 3 on each side of the vat, upon which wheels there is mounted an endless carrier 4, for the bottles, said carrier being provided with baskets or receptacles 5 into which the said bottles are placed. Above the partition or partitions 2, I mount sprocket wheels 6, at each side of the machine, over which the carrier 4 is conducted, said wheels 6 lifting the carrier and the bottles therein above the partition and into position to be submerged in the next adjacent compartment of the vat. Also at the forward end of the vat or tank, and above the latter, I journal sprocket wheels 7 and 8, there being one set of these wheels at each side of the machine. The endless carrier 4 also passes around these wheels. Inasmuch as this part of the structure is the same in principle as that shown and described in the patent above referred to, it is not deemed necessary to enter into a fuller description thereof.

Referring now more particularly to Fig. 2 of the drawings, 9 represents a pulley which is keyed, or otherwise secured, to a shaft 10, said shaft being journaled in a bracket 11 that is secured to the side of the vat 1. 12 is a loose pulley also on said shaft, it being understood that when the driving belt is upon said loose pulley, no power will be transmitted to the mechanism of the machine. Also secured to the shaft 10 is a pinion 13, said pinion meshing with a gear 14, on a shaft that is parallel with the shaft 10 and that is also journaled in the bracket 11. The latter shaft is provided between its bearings with a worm 15, said worm gearing with a worm wheel 16 that is keyed, or otherwise secured, upon the shaft 17, said shaft having secured thereto one pair of the sprocket wheels 3, within the vat 1. By means of the shaft 17 and the train of gearing thus described, the endless belt 4 is caused to travel in the direction of the arrow, shown in Fig. 1. Also secured to the shaft 10 is a pinion 18, said pinion meshing with a gear 19 on a shaft 20 that is journaled in bearings upon the side of the vat 1. The gear 19 has secured to one side thereof a pinion 21, which meshes with a gear 22 on a shaft 23, said shaft extending forwardly in a direction parallel with the shaft 10.

Projecting rearwardly from the tank or vat 1 at each side thereof are frame pieces 24 preferably channel irons, said pieces being supported at their forward ends upon legs 25. The shaft 23 is journaled in brackets 26 on these frame pieces, and extends to a point substantially midway of the frame pieces 24. Mounted in suitable bearings, which are carried by the frame pieces 24, are transverse shafts 27 and 28, the bearings for the latter shaft being adjustable by means of a screw 29 so that the distance between the shafts may be varied. Secured to the shafts 27 and 28 near their ends are sprocket wheels 30 and 31, upon which there is mounted, at each side of the machine, sprocket chains 32. Extending across from one of these chains to the other, and on the outside thereof, are a series of strips or cleats 33, said cleats being so mounted on the chains and so placed with reference to one another that they form a practically continuous belt. By means of the adjustment for the bearings for the shaft 28, above described, the said belt may be tightened or loosened as desired. Hereinafter, in order to distinguish from the carrier 4 of the interior cleaner, I shall refer to the said belt as the belt carrier.

The sprocket wheels 30 are mounted substantially beneath the large sprocket wheels 8 for the interior carrier, so that the said interior carrier projects over the front end of the belt carrier for the exterior cleaner. Mounted upon the interior cleaner, below the sprocket wheels 8, is a curved plate 34, said plate extending transversely across the machine so as to support the bottom of the bottles 35 while they are within the baskets or receptacles 5. This plate 34 terminates above the sprocket wheels 30, and an inclined chute 36 extends downwardly and forwardly from the forward edge of said plate. As the sprocket wheels 8 rotate in the direction of the arrow shown in Fig. 3, the bottles will slide out of their baskets 5 as soon as they have passed the said plate, and will be conducted by the chute 36 to the belt carrier on the exterior cleaner.

For driving the belt carrier, a bevel pinion 37 is secured to the shaft 23, said pinion meshing with a bevel gear 38 that is keyed, or otherwise secured, to the shaft 27.

From the description thus given, it will be understood that both of the said endless carriers are moved with comparatively slow speed, the carrier for the exterior cleaner moving in the direction of the arrow shown in Figs. 2 and 3. Spaced suitable distances apart on said carrier, and connected to the transverse cleats 33 thereof, are outwardly projecting brushes 39, against which the bottom of the bottles are adapted to be pressed, as they are being cleaned, or scrubbed, by the mechanism now to be described.

Projecting upwardly from the frame pieces 24 are plates or housings 40, within which are journaled transverse shafts 41 and 42, said shafts being provided, toward their central portions, with pairs of sprocket wheels 43 and 44. Upon each pair of said sprocket wheels there is mounted a sprocket chain 45 to which are secured transverse cleats 46, said cleats being similar to the cleats 33 heretofore described. Projecting from the outer faces of these cleats are bristles 47, said cleats being so closely positioned that the bristles will be practically continuous. I shall, therefore, call this part of the mechanism the endless brush. The shaft 41 is driven from the shaft 10, as shown in Fig. 2, by means of a pulley 48 that is secured to the latter shaft, said pulley having an endless belt 49 passing thereabout, and thence over a pulley 50 on the said shaft 41. As the pulleys 48 and 50 are in planes at right angles to each other, the belt 49 is properly guided by the guide pulleys 51 and 52 in a manner well understood. Inasmuch as the shaft 10 is driven at a high rate of speed, as compared with the shaft 23, which drives the belt carrier, and the pulley 50 is smaller in diameter than the pulley 48, the endless brush travels at a much higher velocity than the bottles which lie upon the cleats 33 of the belt carrier. When the bottles are deposited upon said carrier, they move forwardly therewith until they are engaged by the rotary brush 47, which will sweep the bottles forward into contact with the brushes 39. The said endless brush cleans the curved surfaces of the bottles, while the bottoms thereof are cleaned by the brushes 39. To facilitate the cleaning of the bottles, the endless brush is given a transverse movement with respect to the belt carrier, which movement rolls the bottles transversely of the carrier, thereby causing the bottoms of the bottles to be thoroughly cleaned by the brushes 39. This transverse movement is effected by a bevel pinion 53, on the forward end of the shaft 23, which pinion meshes with a bevel pinion 54 on a short vertical shaft that is mounted in bearings 55 on the side of the housing 40. The upper end of said vertical shaft is provided with a crank 57, the pin of which projects into an elongated slot 58 in a yoke plate 59 that is mounted upon one of the ends of the shafts 41 and 42. The rear end of said plate 59 is bifurcated and is provided with eye-pieces for the shaft 41, the pulley 50 being secured to the shaft between the bifurcations of the plate. The forward end of the plate is also bifurcated, while a collar 60 is secured to the shaft 42 between the said bifurcations. Instead of having eyepieces at the forward end of the plate 59, said plate is simply forked in order to provide for the adjustment of the shaft 42, which is effected by means of screws 61, shown in Fig. 4, said adjustment tightening or loosening the brush, as may be desired. As the crank 57 rotates, the plate 59 will be moved laterally, which movement will result in shifting the shafts 41 and 42 transversely of the carrier, the said shafts being elongated at their ends opposite said plate to provide for such lateral movement.

Owing to the comparatively slow speed of the exterior carrier and the relative size of gears 53 and 54, the brush will be given at least one complete reciprocation during the passage of the bottles therebeneath. This causes the bottles to be rolled in reverse directions during their excursion beneath the brush thereby insuring a thorough cleaning of the sides and bottoms of the bottles.

In Fig. 4, I have shown a portion of the chute 36 for conveying the bottles to the endless carrier. This chute is longer than the width of the rotary brush; and, for the purpose of taking up all space between the bottles on the belt carrier, I secure to the shafts 41 and 42 downwardly projecting arms 62, to the lower ends of which there are secured plates 63, said plates extending parallel with each other opposite the endless brush, but diverging at the front of the same, and passing upon opposite sides of the chute 36. As the bottles drop upon the belt carrier and are moved toward the brush, the diverging parts of these plates will roll the bottles toward the center of the carrier and thereby concentrate them under the brush. The front ends of the plates 63 are supported by a stationary transverse bar 63ᵃ.

In order that my improved cleaning device may be adapted for all diameters of bottles, I have provided means for adjusting the belt carrier with reference to the endless brush, said means consisting of parallel plates 64 which are mounted upon the ends of links 65, there being one of these plates and a set of said links at each side of the carrier. The plates 64 are beveled at their ends, and, at their centers, they form a support for the belt carrier. When the plates are moved rearwardly, or to the right in Fig. 3, they tend to move away from the said carrier and thereby permit the same to recede from the brush. This movement of the plates 64 is effected by means of connecting rods 66 which extend from said plates to cranks 67, which are secured to a transverse shaft 68. To one end of the shaft 68, I secure a hand wheel 69, by means of which said shaft may be turned. As the shaft is thus turned, the cranks 67 move the plates 64 backwardly or forwardly, as desired, and, in so doing, said plates are lowered or lifted and the endless carrier is thus adjusted with respect to the endless brush. For the purpose of holding the plates 64 in any position to which they may thus be moved, I secure to the shaft 68 a ratchet or gear wheel 70, with which engages a suitable detent pawl 71.

While I have shown and described means for shifting the brush laterally and for moving the belt carrier toward the brush, it will be readily seen that the same results in the operation of the device can be effected by shifting the carrier laterally and by raising and lowering the brush. The following claims that call for a relative movement of these parts are intended, therefore, to cover either of these arrangements.

Having thus described my invention, I claim:

1. In a machine for cleaning bottles or like articles, a carrier for the bottles, means for driving said carrier at a relatively slow speed, means coöperating with said carrier for cleaning the exterior of the bottles, and means for producing a relative lateral movement between the carrier and the cleaning means whereby the bottles are turned as they are being cleaned.

2. In a machine for cleaning bottles or like articles, a carrier for the bottles, means for driving said carrier at a relatively slow speed, a brush so arranged with respect to the carrier that the bottles will be brushed thereby as they are in transit on the carrier, and means for producing a relative transverse movement between the carrier and the brush, whereby the bottles will be turned on the carrier as they are being cleaned.

3. In a machine for cleaning bottles or like articles, a carrier for the bottles, means for driving said carrier at a relatively slow speed, a traveling brush so arranged with respect to the carrier that the bottles will be brushed thereby as they are in transit on the carrier, means for driving said brush at a relatively high speed, and means for moving said brush transversely of the carrier, whereby the bottles will be turned on the carrier as they are being cleaned.

4. In a machine for cleaning bottles or like articles, a carrier for the bottles, means for driving said carrier at a relatively slow speed, an endless brush so mounted with respect to the carrier that the bottles on the latter will be cleaned by the said brush, means for producing a relative transverse movement between the carrier and the brush whereby the bottles will be turned during the cleaning operation, and means on said carrier for cleaning the bottoms of the bottles.

5. In a machine for cleaning bottles or like articles, a carrier for the bottles, means for driving said carrier at a relatively slow speed, a brush so mounted with respect to the carrier that the bottles on the latter will be cleaned by the said brush, mechanism for driving said brush at a relatively high speed, means for moving said brush transversely of the carrier, whereby the bottles will be turned during the cleaning operation, and brushes on said carrier for cleaning the bottoms of the bottles.

6. In a machine for cleaning bottles or like articles, the combination of an endless carrier for the bottles, a brush for cleaning the exteriors of the bottles on the carrier, the brush being so positioned with respect to the carrier that the exterior of the bottles will be cleaned during their transit on said carrier, mechanism for adjusting toward and from the brush the portion of the carrier which is adjacent to said brush, whereby the machine is adapted to clean bottles of different diameters, and means for holding such portion of the carrier in its adjusted position.

7. In a machine for cleaning bottles or like articles, an endless carrier for the bottles, means for delivering the bottles to the carrier so that they will extend lengthwise of the latter, means for driving the carrier at a relatively slow speed, a brush so positioned with respect to the carrier that the bottles on the latter will be cleaned as the bottles are carried past said brush, means for producing a relative transverse movement between the carrier and brush, whereby the bottles will be turned as they are being cleaned, and means for varying the distance between the carrier and the brush whereby the machine is adapted to clean bottles of different sizes.

8. In a device for cleaning bottles or like articles, an endless carrier, brushes mounted upon said carrier, an endless brush so positioned with respect to the carrier that the bottles on the latter will be cleaned on their sides during their transit on the carrier, means for driving said endless brush at a higher speed than the carrier, whereby the bottoms of the bottles will be forced against the brushes on the said carrier, and means for moving the endless brush transversely of the carrier so that the bottles will be turned thereon and their entire exterior cleaned by said brushes.

9. In a device for cleaning bottles or like articles, an endless carrier, brushes mounted upon said carrier, an endless brush so positioned with respect to the carrier that the bottles on the latter will be cleaned on their sides during their transit on the carrier, means for driving said brush at a higher speed than the carrier, whereby the bottoms of the bottles will be forced against the brushes on the said carrier, means for moving the endless brush transversely of the carrier so that the bottles will be turned thereon, and their entire exterior cleaned by said brushes, and mechanism for varying the distance between the carrier and the brush so as to clean bottles of different diameters.

10. In a machine for cleaning bottles and like articles, a carrier for said bottles, means for cleaning the exterior of the bottles while in transit on said carrier, plates beneath the carrier opposite the said cleaning means, and means for raising and lowering said plates whereby the carrier may be moved toward or from the said cleaning means, whereby the machine is adapted to operate upon bottles of different diameters.

11. In a machine for cleaning bottles and like articles, a carrier for said bottles, a brush for cleaning the exterior of the bottles while in transit on said carrier, plates beneath the carrier opposite the said brush, means for raising and lowering said plates whereby the carrier may be moved toward or from the said cleaning means, whereby the machine is adapted to operate upon bottles of different diameters, and means for causing the bottles to turn while being cleaned.

12. In a machine for cleaning bottles or like articles, and endless carrier for the bottles, bottle cleaning means so mounted with respect to said carrier that the bottles on the latter will be cleaned during their transit, plates beneath the carrier opposite said cleaning means, pivoted links supporting said plates, a shaft, means whereby said shaft may be rocked, cranks on said shaft, and connections between said cranks and said plates whereby the latter may be raised or lowered by rocking the said links, and the carrier will thus be moved toward or from the cleaning means, so that the machine may operate upon bottles of different diameters.

13. In a machine for cleaning bottles or like articles, an endless carrier for the bottles, a rotary brush so mounted with respect to said carrier that the bottles on the latter will be cleaned during their transit, plates beneath the carrier opposite said brush, pivoted links supporting said plates, a shaft, means whereby said shaft may be rocked, cranks on said shaft, connections between said cranks and said plates whereby the latter may be raised or lowered by rocking the said links, and the carrier will thus be moved toward or from the brush, so that the machine may operate upon bottles of different diameters, and a pawl and ratchet mechanism for holding the shaft and the carrier in position.

14. In a machine for cleaning bottles or like articles, an endless brush, means for operating said brush, means for supporting the bottles in position to be operated upon by said brush, and mechanism for moving said brush while rotating so as to turn the bottles.

15. In a machine for cleaning bottles or like articles, an endless brush, means for operating said brush, means for supporting the bottles in position to be operated upon by said brush, mechanism for moving said brush while rotating so as to turn the bottles, and means for moving said bottle supporting means toward and from the brush so as to clean bottles of different diameters.

16. In a machine for cleaning bottles and like articles, means for supporting the bottles, a brush on said means, said bottles being adapted to lie with their bottoms against said brush, an endless brush mounted over said supporting means, means for driving said brush, and mechanism for producing a relative transverse movement between said support and the brush whereby the bottles are turned by the latter and the bottoms of the bottles are cleaned by the brush on the said supporting means.

17. In a machine for cleaning bottles and like articles, means for supporting the bottles, a brush on said means, said bottles being adapted to lie with their bottoms against said brush, an endless brush mounted over said supporting means, means for driving said brush, and mechanism for moving the rotary brush transversely of the bottle supporting means, whereby the bottles are turned as they are cleaned.

18. In a machine for cleaning bottles and like articles, a carrier for the bottles, an endless brush so mounted with respect to the carrier that the bottles are cleaned thereby when in transit, said brush being mounted upon shafts transverse to the length of said carrier, a yoke plate connecting said shafts at one end, said plate being provided with a slot, a crank shaft, means for turning said shaft, and a crank on said shaft having a pin projecting into said slot in the plate whereby, as said crank rotates, the brush will be shifted transversely of the carrier and the bottles will be turned while being cleaned.

19. In a machine for cleaning bottles and like articles, a carrier for the bottles, an endless brush so mounted with respect to the carrier that the bottles are cleaned thereby when in transit, said brush being mounted upon shafts transverse to the length of said carrier, a yoke plate connecting said shafts at one end, said plate being provided with a slot, a crank shaft, means for turning said shaft, a crank on said shaft having a pin projecting into said slot in the plate, whereby, as said crank rotates, the brush will be shifted transversely of the carrier and the bottles will be turned while being cleaned, and means for moving the carrier toward and from the brush so as to clean bottles of different diameters.

20. In a device for cleaning bottles or like articles, the combination of an endless carrier, brushes mounted upon said carrier, an endless brush so positioned with respect to the carrier that bottles on the latter will be cleaned on their sides during their transit on the carrier, means for driving said brush at a higher speed than the carrier whereby the bottoms of the bottles will be forced against the brushes on said carrier, and means for causing relative transverse movement between the carrier and the brush whereby the bottles on said carrier will be rotated.

21. In a machine for cleaning bottles and like articles, the combination of a carrier for the bottles, an endless brush adjacent to said carrier, and means for moving a portion of said carrier toward and from said brush to accommodate bottles of different diameters therebetween.

22. In a machine for cleaning bottles and like articles, the combination of an endless carrier for the bottles, an endless brush mounted in proximity to said carrier, means for rotating said brush, and means for moving to and from said brush and for supporting in position the portion of the carrier which is adjacent thereto.

23. In a machine for cleaning bottles and like articles, the combination of a carrier for bottles, an endless brush mounted in proximity to said carrier, and means for causing the bottles on the carrier to be rotated in reverse directions while subjected to the action of the brush.

24. In a machine for cleaning bottles or like articles, the combination of a carrier, an endless brush, means for rotating said brush, and means for reciprocating said brush transversely with respect to said carrier.

25. In a machine for cleaning bottles and like articles, the combination of a carrier, an endless brush mounted adjacent to said carrier, means for reciprocating said brush transversely of the carrier, means for delivering bottles onto said carrier, and means movable with the brush, during its reciprocation for moving said bottles laterally on said carrier to bring them into position for being cleaned by the brush.

In testimony whereof, I hereunto affix my signature in the presence of two witnesses.

GEORGE R. LAWRENCE.

Witnesses:
S. E. FOUTS,
J. B. HULL.